United States Patent [19]

Sernevi

[11] 4,279,065

[45] Jul. 21, 1981

[54] MACHINE DESIGNED TO FILL HOLLOW PROFILE RODS WITH A GRANULAR MATERIAL

[76] Inventor: Sten Sernevi, Glarhallavägen 4, S-260 43 Arild, Sweden

[21] Appl. No.: 85,991

[22] Filed: Oct. 18, 1979

[51] Int. Cl.[3] .......................... B23P 19/02; B65B 1/06; B65B 7/28; E06B 3/24

[52] U.S. Cl. .................................... 29/33 K; 29/564.6; 29/797; 53/284; 53/319; 53/471

[58] Field of Search .................. 29/33 K, 564.1, 564.6, 29/235, 451, 797; 53/268, 281, 284, 298, 319, 471, 389

[56] References Cited

U.S. PATENT DOCUMENTS

| | | | |
|---|---|---|---|
| 2,884,748 | 5/1959 | Berg | 53/471 X |
| 3,166,839 | 1/1965 | Dock et al. | 53/471 X |
| 3,182,433 | 5/1965 | Beckham | 53/284 X |

*Primary Examiner*—Z. R. Bilinsky
*Attorney, Agent, or Firm*—Allan R. Plumley

[57] ABSTRACT

The invention concerns a machine design to fill hollow profile rods, such as spacer rods for insulating window panes, with a granular material which serves as a desiccating agent.

The purpose of the machine is to mechanize to a large extent the filling operation which has hitherto been performed manually. For this purpose, the machine comprises conveyor belts (1) arranged to move lengthwise profile rods (2) positioned on the conveyor belts (8) positioned at one end of the conveyor belts (1) for parallel advancement of strips into individual channels (13) formed in a housing (14) positioned in front of the belts (8), a heating wire (15) which is arranged to move across each strip (7) so as to melt off one end piece from each strip (7) which end piece will be positioned in a channel (13), and a number of pusher rods (17) which are positioned adjacent one another and which are displaceable into one channel (13) each and which, upon their displacement, force one end piece into one of the ends of their respective profile rod (2).

At the opposite side the machine is provided with a device to fill granular material into the profile rods (2) which have been transported to this machine side after having been tilted on top of the conveyor belts (1) to an upwards inclined position, and a device, like the one described above, for insertion of an end piece from a strip (7) into the opposite end of each profile rod.

5 Claims, 12 Drawing Figures

MACHINE DESIGNED TO FILL HOLLOW PROFILE RODS WITH A GRANULAR MATERIAL

Figure 1:
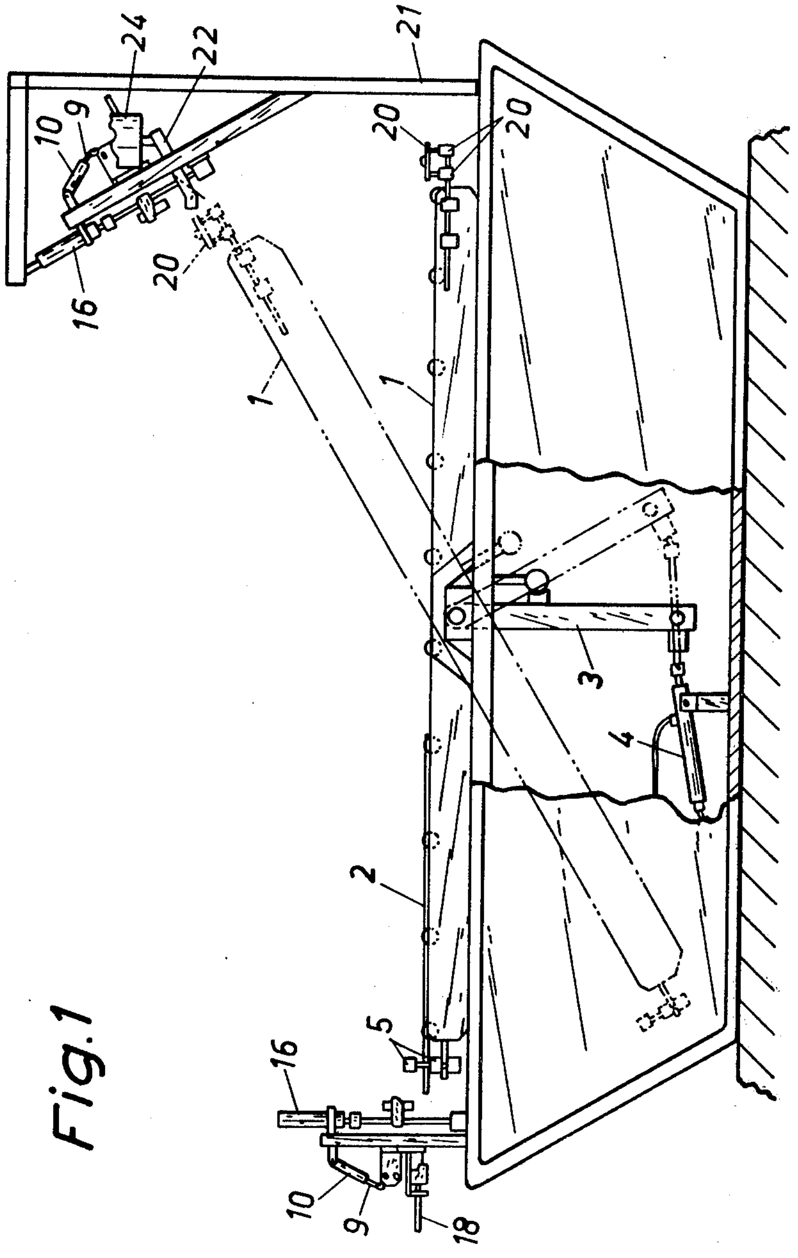

The subject invention relates to a machine designed to fill hollow profile rods, preferably spacer rods for insulating window panes, with granular material such as desiccating agents, and to thereafter seal off the profile rods at their ends.

Hitherto, the operations involved in filling profile rods of this kind have been performed manually, which is a very complicated and time-consuming task.

With the machine in accordance with the invention it has become possible to mechanize this task considerably and consequently the monotonous manual work of filling the profile rods is completely eliminated. It is characteristic of the invention that the machine comprises conveyor belts arranged on a tiltable frame to displace profile rods positioned in parallel thereon, means to advance strips of a sealing material, a member to cut end pieces from the strips, means to press one such end piece into one of the ends of each profile rod, means to advance the unsealed ends of the profile rods in an obliquely upwards direction into a distribution chamber holding a granular material, in which position the granular material flows downwards into the profile rods so as to fill the latter, and means to press end pieces into said last-mentioned ends of the profile bars after they have been filled.

Figure 2:
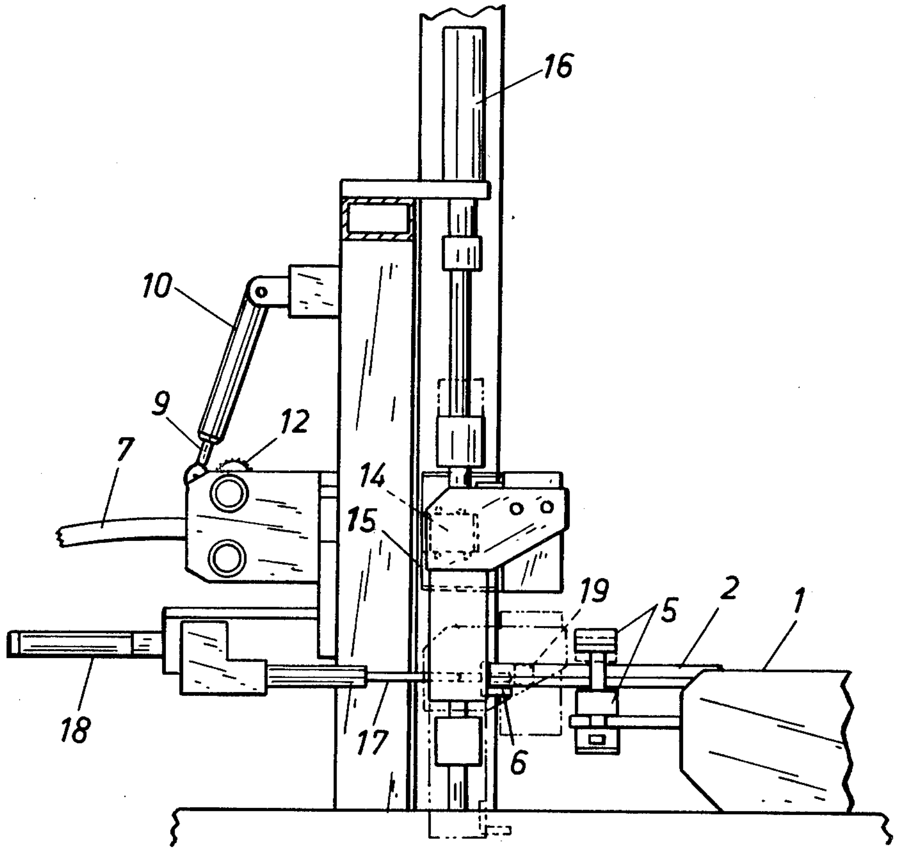
Figure 3:
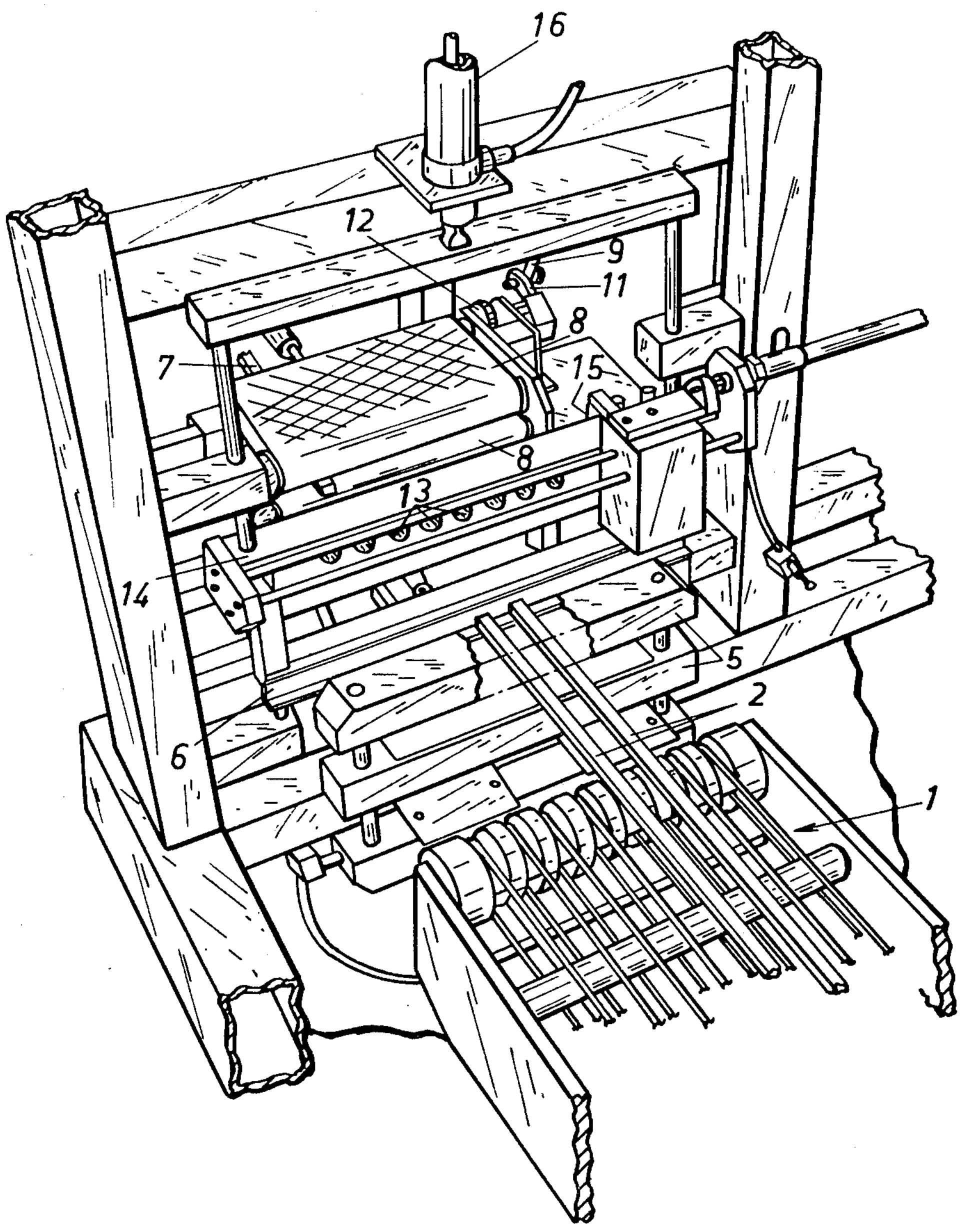
Figure 4:
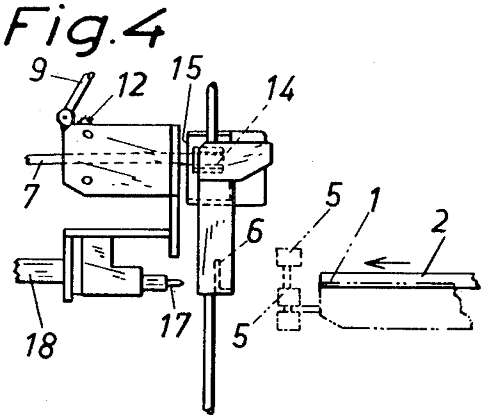
Figure 5:
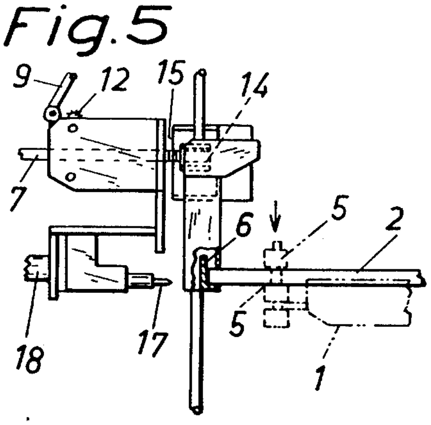
Figure 6:
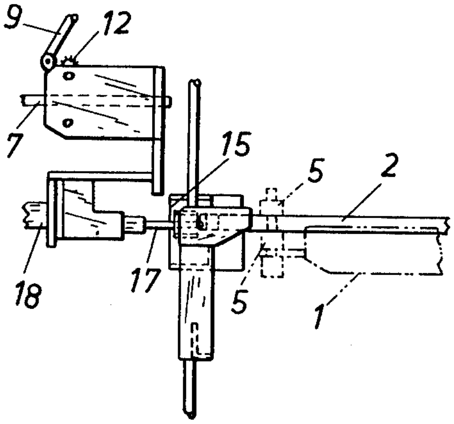
Figure 7:
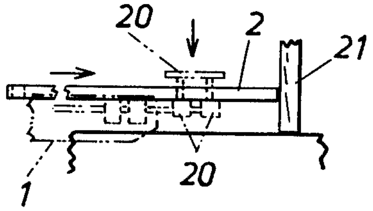
Figure 8:
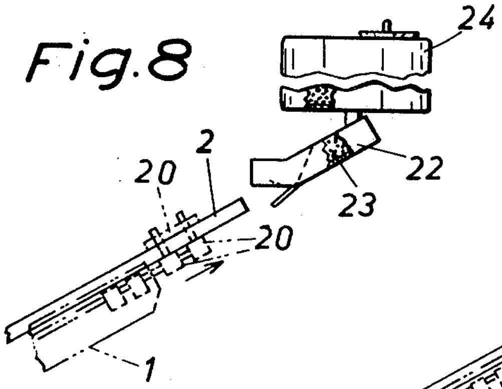
Figure 9:
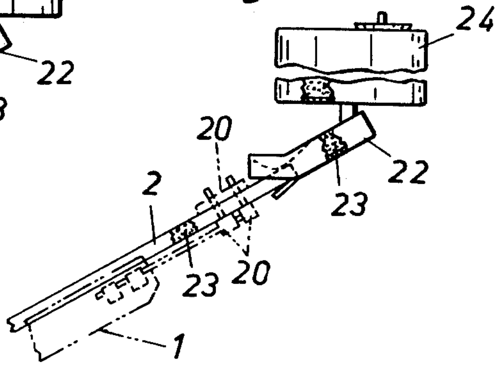
Figure 10:
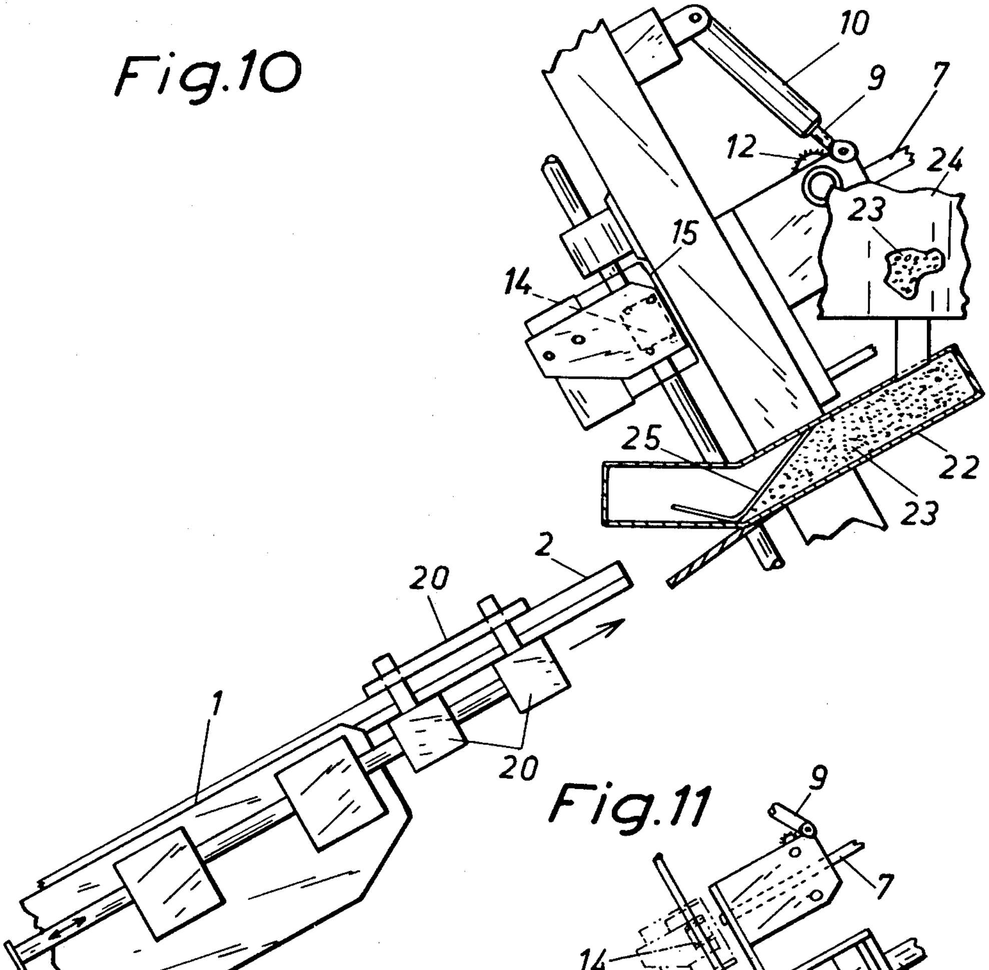
Figure 11:
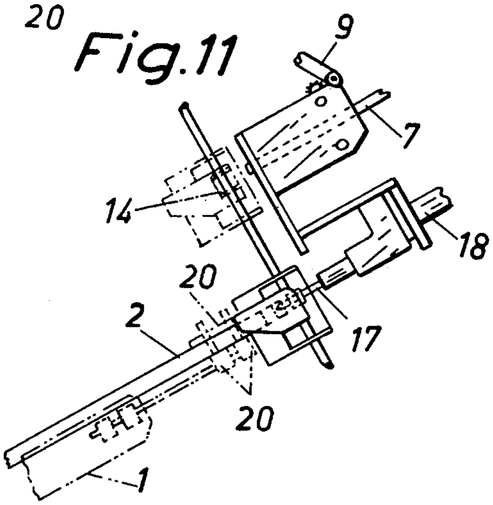
Figure 12:
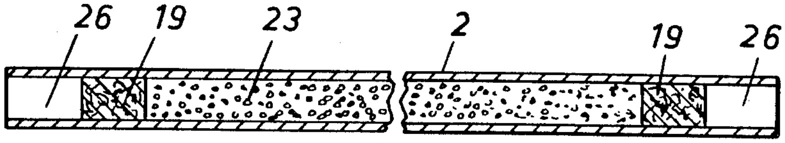

The invention will be described in closer detail in the following with reference to the accompanying drawings. In the drawings:

FIG. 1 is a lateral view of the machine,

FIG. 2 is a lateral view of the left-hand side of the machine of FIG. 1 shown on a larger scale, FIG. 3 is a perspective view of the same left machine side, FIGS. 4 to 6 are lateral views of the same left side, again on a smaler scale, showing various stages of the machine operation, FIGS. 7 to 9 are lateral views of the opposite side of the machine in different stages of operation, FIG. 10 shows the same position as in FIG. 8 but on a larger scale, FIG. 11 is a lateral view of a device on the right-hand side of the machine, corresponding to the device in FIGS. 4 to 6 at the left-hand side of the machine, and FIG. 12 is a longitudinal sectional view through a filled profile rod in a broken view.

FIG. 1 is a general side view of the machine. The machine comprises conveyor belts 1 on which hollow profile rods 2 are advanced to the various means incorporated in the machine.

The conveyor belts 1 are mounted on a tiltabe frame 3 which is arranged to pivot the conveyor belts 1 by means of a piston-and-cylinder unit 4 from the horizontal position indicated in FIG. 1 in continuous lines to the inclined position indicated in dash-and-dot lines and back to the starting position.

Profile rods 2 while positioned adjacent one another, are advanced on the conveyor belts 1, to the left as seen in FIG. 1, and are inserted between two pairs of collet jaws 5 until they abut against a shoulder 6, whereby is ensured that the ends of the profile rods 2 assume a position exactly in alignment with one another, whereupon the collet jaws 5 securingly clamp the profile rods 2 and retain them in this position.

A short distance above the profile rods 2 are arranged means to advance strips 7 in parallel with one another (see FIGS. 4 to 6), said strips preferably consisting of foam rubber and intended to form plugs at the end of the profile rods. These advancement means consist of two endless belts 8, one positioned above the other. A piston cylinder 10 interconnects its associated piston rod 9 with a drive roller, one for each belt 8, via a crank turning mechanism 11 and a sproket wheel 12. The stroke of the piston rod 9 urges the belts 8 to advance the strips 7 substantially in parallel with one another over a distance which is sufficient to ensure that the ends of the strips run into one channel 13 each formed in a housing 14 arranged on front of the belts 8. On the rear of this housing 14, i.e. in the gap between the housing and the belts 8, is provided a cutting means, preferably in the form of a heating wire 15 which is arranged in a vertical position and so as to move horizontally along the rear of the housing. During its movement from the right to the left as seen in FIG. 3, this heating wire 15 is arranged to successively cut an end piece off each strip 7, and, each such end piece will be supported in a channel 13.

The housing 14 is integrally or rigidly connected to the shoulder 6. These details are arranged to be moved vertically by means of a piston-and-cylinder unit 16 from the position shown in FIG. 4, wherein the housing 14 is positioned opposite the point of discharge between the belts 8, down to the position illustrated in FIG. 6, i.e. a position opposite the mouths of the profile rods 2. At the side of the housing 14 remote from the profile rods 2, one pusher rod 17 is here situated opposite each channel 13 (see also FIG. 2). The row of pusher rods 17 may be displaced backwards and forwards by means of a piston-and-cylinder unit 18.

When displaced in the forwards direction, the pusher rods 17 will be introduced into the respective channel 13 positioned in front of each rod and in doing so push the cut-off piece 19 of strip 7 positioned therein out of the channel 13 and into the end of the profile rod 2 positioned at the opposite side of the channel. The size of the inserted piece 19 matches that of the cavity of the profile rod 2 to the extent that the end piece 19 fills the cavity fully in the end area and thus forms a plug 19 (see FIG. 12).

The collet jaws 5 now release their grip on the profile rods 2 and at the same time the pusher rods are retracted, and the profile rods 2 are then advanced on the conveyor belts 1 to the opposite side of the machine. At this side, the profile rods 2 are inserted between a pair of collet jaws 20 in the same manner as before and also here they are moved into abutment against a shoulder 21. These collet jaws 20 are arranged for displacement over a short distance to and fro in the direction of advancement of the profile rods 2.

As soon as the collet jaws 20 exert a clamping action on the profile rods 2, the tiltable frame 3 pivots the conveyor belts 1 to the position illustrated in FIG. 1 in dash-and-dot lines, in which position the profile rods 2 are directed obliquely upwards towards a ditribution chamber 22 which is filled with a granular material 23. The storage chamber 22 slants in the direction towards the profile rods 2 and communicates at its upper portion with a supply container 24 holding more granular material 23 and is closed off at its lower end by means of a resilient wall 25. In a manner known per se the wall 25 can consist of a number of wires of a resilient material positioned closely adjancent one another.

When the profile rods 2 are displaced by the collet jaws 20 from the position of FIG. 8 to the position of FIG. 9, the ends of the profile rods 2 will penetrate into the distribution chamber 22. The wall 25 will then spring upwards only exactly in the area of penetration of the profile rods 2, while the rest of the wall between the profile rods 2 will remain well sealed. Granular material 23 now flows down into the profile rods 2, filling the larger portion thereof, whereupon the filled-cup profile rods 2 are again retracted from the distribution chamber 22. While still in its tilted position, the conveyor belts 1 with the profile rods 2 thereon is transported transversely to a device positioned adjacent the filler device to seal off the filled-up profile rods 2. The sealing device is designed and operates like the corresponding device at the opposite side of the machine. This device, which is shown in closer detail in FIG. 11, therefore need not be described in detail. Corresponding means and details of this sealing device have received the same reference numerals as the device described above.

Each profile rod 2 has now been given its final appearance as seen in a longitudinal sectional view illustrated in FIG. 12, i.e. the profile rods 2 are almost entirely filled with the granular material 23 which is retained in position with the aid of plugs 19, one in each end. In case the profile rods 2 are to be used to assemble spacer frames for insulating window panes, a small space 26 is preferably left at the two outermost ends of each profile rod to accommodate corner pieces which are intended to interconnect the individual profile rods.

The invention is not limited to the embodiment as shown and described but the machine could be modified in a variety of ways within the scope of the appended claims. Preferably additional conveyor belts are connected to the machine for automated supply into the machine of empty profile rods 2 and for conveying profile rods, filled and equipped with plugs from the machine.

I claim:

1. A machine designed to fill hollow profile rods (2), preferably spacer rods for insulating window panes, with a granular material (23), such as a desiccating agent, and to thereafter seal off the profile rods (2) at both ends, characterised in that the machine comprises conveyor belts (1) arranged on a tiltable frame (3) to displace profile rods (2) positioned in parallel thereon, means (8) to advance strips (7) of a sealing material, a member (15) to cut end pieces (19) from the strips (7), means (17) to press one such end piece (19) into one of the ends of each profile rod (2), means (20) to advance the unsealed ends of profile rods (2) in an obliquely upwards direction into a distribution chamber (22) holding a granular material (23), in which position the granular material (23) flows downwads into the profile rods (2) so as to fill the latter, and means (17) to press end pieces (19) into said last-mentioned ends of the profile rods (2) after filling thereof.

2. A machine as claimed in claim 1, characterised in that the means for advancement of the strips (7) consist of two endless belts (8), one positioned above the other, and in that a piston-and-cylinder unit (10) is coupled by means of its piston rod (9) with drive rolls one for each belt (8) via a crank mechanism (11) and a sprocket wheel (12), the stroke movements of said piston rod (9) arranged to effect step-by-step advancement of the strips between the belts (8).

3. A machine as claimed in claim 1, characterised in that the means for cutting off end pieces (19) consists of a heating wire (15) which is arranged for movement across said strips (7).

4. A machine as claimed in claim 1, characterised in that the means for pressing an end piece (19) into one of the ends of each profile rod (2) consist of pusher rods (17) which are displaceable in their lengthwise direction by means of a piston-and-cylinder unit (18).

5. A machine as claimed in claim 1, characterised in that the means for advancement of the unsealed ends of the profile rods (2) into the distribution chamber (22) holding the granular material (23) are collet jaws (20) which are arranged to be displaced by a piston-and-cylinder unit and to retain the profile rods (2) in the same mutual position throughout the displacement movement.

* * * * *